United States Patent [19]

Ohyauchi et al.

[11] Patent Number: 4,759,997
[45] Date of Patent: Jul. 26, 1988

[54] AIR SUPPLY APPARATUS FOR FUEL CELL SYSTEM

[75] Inventors: Hideo Ohyauchi; Yoshiaki Amano; Asao Hanzawa, all of Ibaraki, Japan

[73] Assignee: Hitachi, Ltd., Tokyo, Japan

[21] Appl. No.: 6,426

[22] Filed: Jan. 23, 1987

[30] Foreign Application Priority Data

Jan. 23, 1986 [JP] Japan .................................. 61-11083

[51] Int. Cl.$^4$ ............................................. H01M 8/06
[52] U.S. Cl. ...................................... 429/19; 60/39.07
[58] Field of Search .................... 60/39.06, 39.07, 723; 429/17, 19

[56] References Cited

U.S. PATENT DOCUMENTS

| | | | |
|---|---|---|---|
| 3,928,961 | 12/1975 | Pfefferle | 60/723 |
| 3,976,507 | 8/1976 | Bloomfield | 429/19 |
| 4,112,675 | 9/1978 | Pillsbury et al. | 60/723 |
| 4,678,723 | 7/1987 | Wertheim | 429/19 |
| 4,696,871 | 9/1987 | Pinto | 429/19 |

FOREIGN PATENT DOCUMENTS 23317 2/1980 Japan ..................................... 60/723

OTHER PUBLICATIONS

Handley & Cohen, "Specification for Dispersed Fuel Cell Generator"; EPRI Interim Report, Project 1777-1 Nov., 1981.

Primary Examiner—Louis J. Casaregola
Attorney, Agent, or Firm—Antonelli, Terry & Wands

[57] ABSTRACT

The air supply apparatus for fuel cell system serves to supply air to the cell cathode and the combustion section of the reformer in the fuel cell system and recover energy from exhaust gases being discharged from the system. The apparatus has a compressor for supply of air to the system, an exhaust gas turbine for driving the compressor through recovery of energy from the system exhaust gas, an auxiliary combustor for compensating deficiency of the energy being recovered, if any, and pipe lines connecting those parts. The auxiliary combustor particularly employs a combustion catalyst in its combustion section. The apparatus secures stable combustion of the fuel gas in the auxiliary combustor, and its operation displays improved stability against any load change or partial load.

6 Claims, 3 Drawing Sheets

AIR SUPPLY APPARATUS FOR FUEL CELL SYSTEM

BACKGROUND OF THE INVENTION

The invention relates to an air supply apparatus for use in a fuel cell system, and more specifically to such apparatus for a fuel cell system of the type which is suitable for stable operation under servere conditions of sharp fluctuation of load or air pressure being supplied.

Concerning conventional air supply apparatus for a fuel cell system, it has typically been discussed in a technical literature entitled "Specification for Dispersed Fuel Cell Generator", one of the technological reports of electric Power Research Institute (EPRI) in America.

Generally, the air supply apparatus for a fuel cell system serves to supply air to a cell cathode of the fuel cell system and a combustion section of the reformer unit while effecting recovery of energy possessed by exhaust air from the cell cathode and exhaust gas from the combustion section of the reformer unit.

With such conventional apparatus for air supply applied to a fuel cell system wherein severe load fluctuation tends to occur, there has been involved the following disadvantages.

a. Due to sudden load changes, there may occur fluctuation of air or fuel supply pressure. This tends to cause unstable combustion, blowing-out of burning flames, etc.

b. When operating under a partial load, the flow rate of fuel or air passing through the fuel nozzle or the air nozzle, respectively, will be reduced so that its velocity of flow is decreased beyond a design limit. This tends to incur unstable combustion, blowing-out of burning flames, etc.

c. Due to elevated temperatures of combustion, there may be provided a significantly large amount of nitrogen oxide ($NO_x$)

d. Since the apparatus inherently incorporates those parts for ignition or pilot, there may arise the extra necessity of maintaining high reliabilities of those accessory parts for safety.

SUMMARY OF THE INVENTION

An object of the invention is to provide an air supply apparatus for use in a fuel cell system which, through stabilization of combustion attainable by an auxiliary burner in the apparatus, can secure stable operating conditions under either any load fluctuation or partial load operation.

To achieve the above object, according to the invention, there is provided an air supply apparatus for a fuel cell system, which comprises a compressor for supply of air to the fuel cell system; an exhaust gas turbine for driving the compressor by recovery of energy from exhaust gas from the fuel cell system; an auxiliary combustor disposed upstream of the exhaust gas turbine for supplementing energy when the recovered energy is insufficient; and a piping system connecting those mentioned parts, characterized in that the auxiliary combustor employs a catalyst for combustion in its combustion section.

In the combustion process by means of a combustion catalyst, generally, it is advantageous that the process itself is substantially stable with little effect by fluctuation of supply rate or pressure of fuel and air, and additionally, the combustion is attainable even at relatively low temperatures thereby enabling reduction of the $NO_x$ content while avoiding complication of parts for ignition. According to the invention, therefore, wherein the auxiliary combustor employs a combustion catalyst in its combustion section, there can be provided an air supply apparatus of the type featured by stable operation.

Further features, objects and advantages of the invention will become more apparent upon reading of the following description of the invention with reference to the accompanying drawings.

DESCRIPTION OF PREFERRED EMBODIMENTS

Prior to describing a specific embodiment of the invention, an air supply apparatus of conventional design for fuel cell system will now be described with reference to FIG. 3.

Figure 3:
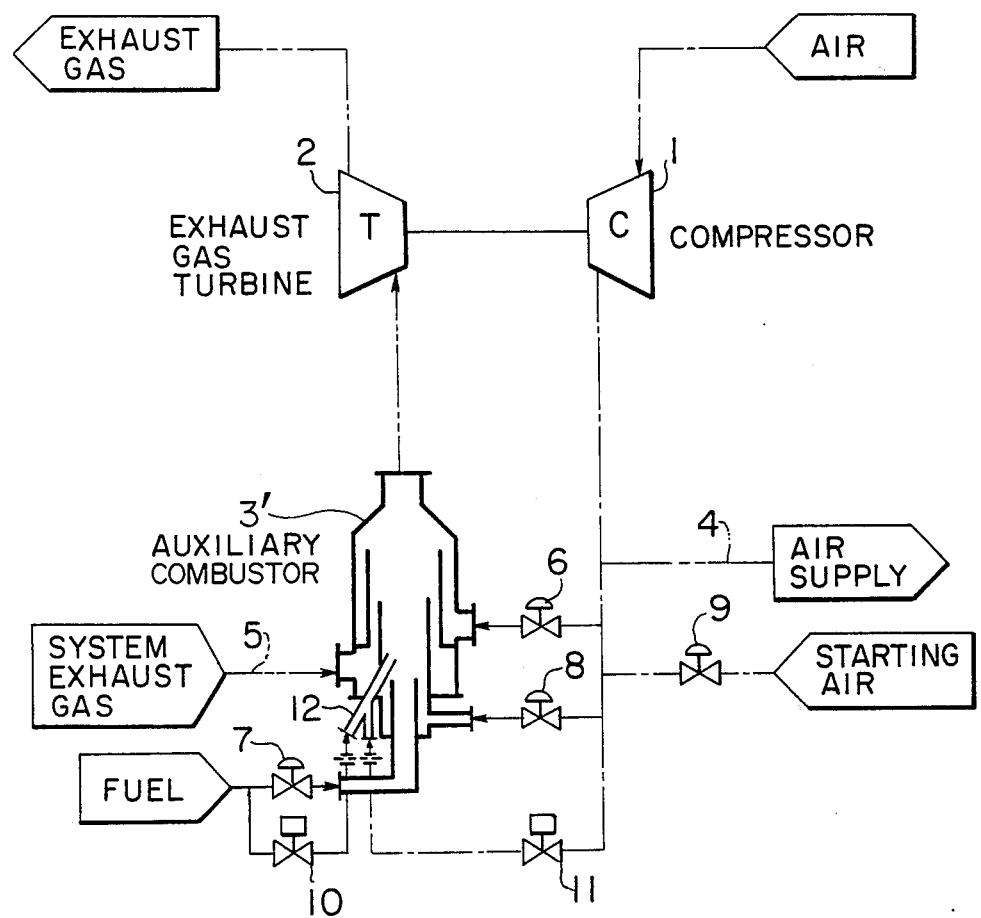
FIG. 3 is a schematic view showing a conventional air supply apparatus for fuel cell system.

In FIG. 3, the reference numeral 1 indicates a compressor for supply of air to both a cell cathode and a combustion section of a reformer unit (not shown) incorporated in the fuel cell system; 2 an exhaust gas turbine for driving the compressor 1 by recovery of energy possessed by exhaust gases from the cell cathode and combustion section of the reformer unit in the system; 3' an auxiliary combustor disposed upstream of the exhaust gas turbine 2 and being adapted to supplement energy when the recovered energy proves insufficient; 4 a pipe line for air supply; 5 a further pipe line for supply of exhaust gas from the system; 6 a pressure differential regulating valve; 7 a fuel flow control valve for supply of fuel to the auxiliary combustor 3'; 8 a flow control valve for combustion air to be supplied to the auxiliary combustor 3'; 9 a starting air flow control valve; 12 a pilot burner for ignition of the auxiliary combustor 3'; 10 a pilot gas shut-off valve for supply of combustion air to the pilot burner 12; and 11 indicates a pilot air shut-off valve for supply of combustion air to the pilot burner 12.

The air supply apparatus arranged as above will now be described of its operation.

Air in the atmosphere is drawn into the compressor 1 where its pressure is elevated to a predetermined level.

A portion of the output of compressed air from the compressor 1, as much as required by the fuel cell system, is supplied via the air supply pipe line 4 to the cell cathode in the fuel cell system and the combustion section of the reformer. The combustion air flow control valve 8 serves to control the flow of air which is required for combustion in the auxiliary combustor 3'.

In this arrangement, further, any extra volume of air is to be bypassed to the auxiliary combustor 3' through the system pressure differential regulating valve 6.

Meanwhile, exhaust gases from the fuel cell system, i.e. those from the cell cathode and from the combustion section of the reformer unit, are fed to the exhaust gas turbine 2 through the exhaust gas pipe line 5 and then the auxiliary combustor 3', whereby their hydromechanical energy is recovered so as to drive the compressor 1 and exhaust the same into the atmosphere.

If, in this instance, the hydromechnical energy possessed by the exhaust gases from the system happens to be insufficient to activate the compressor 1, then the auxiliary combustor 3' will provide supplementary energy for compensation.

While ignition means for the auxiliary combustor 3' may be of the direct ignition type the FIG. 3 example has a pilot system.

Now, the inventive apparatus will be described of its specific embodiment with reference to FIGS. 1 and 2 in addition to FIG. 3, wherein like parts are identified by like reference numerals throughout all the Figures.

Figure 1:
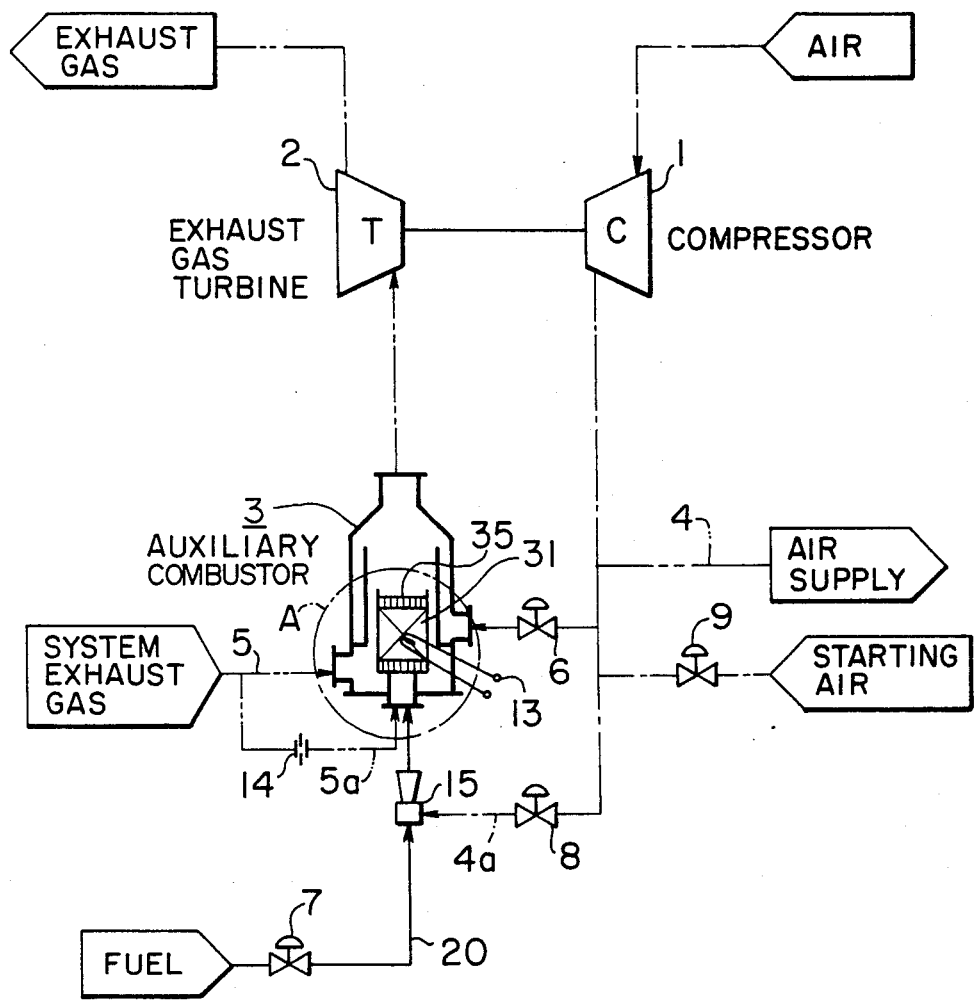
FIG. 1 is a schematic view showing systematically an air supply apparatus for a fuel cell system according to the embodiment of the invention.

In FIG. 1, the auxiliary combustor 3 is provided centrally with a catalytic combustion section indicated by a phantom circle A, wherein the reference numeral 31 represents a combustion catalyst.

The reference numeral 13 indicates a heater for preheating the combustion catalyst 31 when starting the combustion, and 14 indicates an orifice for adjustment of the exhaust gas flow from the fuel cell system, which orifice being disposed midway of a branch pipe line 5a diverging from the exhaust gas pipe line 5 for conducting the system exhaust gas into the combustion section 35 of the auxiliary combustor 3. 20 indicates a fuel gas pipe line for conducting fuel gas to the combustion section of the auxiliary combustor 3, the line being provided with a fuel flow control valve 7 and a mixer 15 located downstream of the control valve 7 to provide a fuel-air mixture. The mixer 15 connects an air pipe line 4a for supply of air from the compressor 1 to the mixer which line being provided with a combustion air flow control valve 8.

Figure 2:
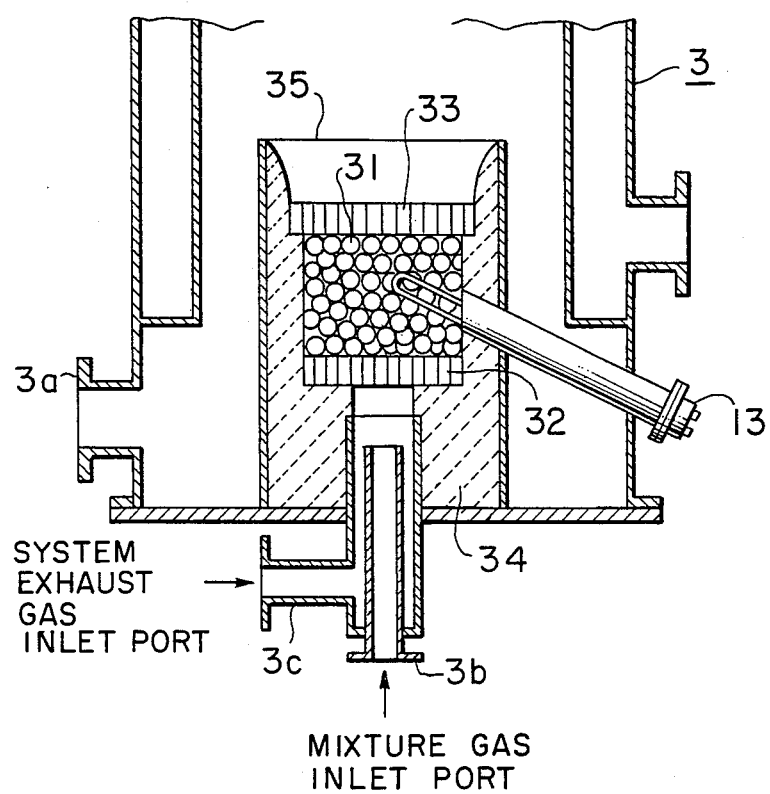
FIG. 2 is a sectional view of a detail of a catalytical combustion section in an auxiliary combustor of the apparatus.

In FIG. 2 showing the catalytical combustion section, the reference numeral 32 indicates a honeycomb member for support of the combustion catalyst 31, 33 a further honeycomb member for holding the combustion catalyst 31 against upward movement while providing a uniform flow of the combustion gas, and 34 indicates a closure shield of refractory material surrounding the honeycomb support members, which being secured to the framework of the auxiliary combustor 3.

3a indicates a system exhaust gas inlet port to be connected to the system exhaust gas pipe line 5, 3b a mixture gas inlet port to be connected to the mixer 15, and 3c indicates a system exhaust gas inlet port leading to the catalytic combustion section, which port being connected to the above described orifice 14.

In practice, the combustion catalyst 31 may be composed of aluminum as the carrier and precious metals such as vanadium, platinum, etc. or oxidized copper. In the present embodiment, however, the combustion catalyst 31 in the combustion section of the auxiliary burner 3 is formed from vanadium-coated alumina of particular composition with a relatively heat-resisting property. The combustion catalyst 31 is mostly in the form of granules each approximately 5 mm in diameter or of a honeycomb construction. FIG. 2 shows one example of the granular type.

Generally, the combustion catalyst is preferably used under the condition of the combustion temperature being restricted to a relatively low level, since its catalytical performance for enhancement of combustion will be deteriorated in case the combustion temperature exceeds 1200° C. In the present embodiment, accordingly, it is arranged that the system exhaust gas of a relatively low temperature is supplied to the combustion section in the combustor so as to maintain the combustion temperature low enough e.g. about several hundred degrees Centigrade. The orifice 14 serves to adjust the flow rate of exhaust gas.

The operation of the air supply apparatus shown in FIGS. 1 and 2 and embodied according to the invention will now be described particularly focusing on its unique stages unlike that of the FIG. 3 example.

The amount of air necessary for the starting and combustion of the auxilary combustor 3 is controlled by the starting air flow control valve 9 and the combustion air flow control valve 8.

The combustion catalyst 31, which is supported by the honeycomb 32 within the refractory closure 34, is preheated by the heater 13.

The exhaust gas from the fuel cell system enters the system gas inlet port 3a through the system exhaust gas pipe line 5, and thence through the auxiliary burner 3, flows to the exhaust gas turbine 2 where its hydromechanical energy is consumed to drive the compressor 1, and then is discharged in the atmosphere.

If, in this instance, it happens that the energy possessed by the exhaust gas from the fuel cell system proves insufficient to the desired drive of the compressor 1, then such deficiency of energy will be made up by means of the auxiliary burner 3.

The mixer 15 provides a mixture of fuel gas, which has been controlled by the fuel flow control valve 7, and air which has been controlled by the combustion air flow control valve 8. This fuel-air mixture is conducted into the refractory closure 34 through the mixture gas inlet port 3b, of the catalytic combustion section, and thence flows through the honeycomb 32, the combustion catalyst 31 and the further honeycomb 33. During this flow, the fuel gas achieves oxidation, that is, burning under the catalytic action. On this occasion, it is to be noted that the combustion temperature being provided during the combustion process can be maintained at a relatively low level by virtue of the system exhaust gas being introduced into the refractory closure structure 34 through the orifice.

As apparent from the foregoing, the process of catalytic combustion which is essentially incorporated in the invention has the following advantages over that of the conventional burner combustion.

a. It secures a broader inflammability limit (a combustible range of air-fuel ratios.
b. It shows a higher upper limit of the blowing-out of burning flames (upper limit of the gas velocity causing the blowing-out of burning flames).

As compared with the burner combustion, therefore, the catalytic combustion is less susceptible to adverse effects of fluctuation in flow, pressure or composition of the fuel or air due to load changes, and so any unstable combustion or blowing-out of burning flames that may result from possible load changes in the fuel cell, can be avoided.

Further, when operating the fuel cell under a partial load, there will hardly occur such diminution in size of the flame or instability of combustion as is often the case with the process of burner combustion.

Still further, there will be a significantly reduced quantity of $NO_x$ output because of the fact that the combustion can take place at a relatively low temperature, and therefore the desired reduction of $NO_x$ output is attainable.

Yet further, the inventive apparatus employing the catalytic combustion system can eliminate such complicated parts as involved in the burner combustion system e.g. the pilot burner 12, pilot gas shut-off valve 10, pilot air shut-off valve 11, etc. This provides the apparatus with higher reliability. The appararus, thanks to the catalytic combustion system it employs, appreciably reduces operating failures due to blowing-out of burning flams, and hence displays an improved safety.

As will be clear from the foregoing description, according to the invention, it is possible to provide an air supply apparatus for use in a fuel cell system in which while securing stable combustion by the auxiliary combustor, stable operation of the apparatus is attainable consistently even under the condition of any load changes in the fuel cell or of partial load operation.

What is claimed is:

1. An air supply apparatus in a fuel cell system comprising: a compressor for supplying air to the fuel cell system; an exhaust gas turbine which drives said compressor through recovery of energy from exhaust gas from said fuel cell system; and auxiliary combustor disposed upstream of and in operative association with said exhaust gas turbine so as to compensate for any deficiency of energy recovered from said exhaust gas; said auxiliary combustor includes a combustion section provided with a combustion catalyst and with a heater arranged within the combustion catalyst for preheating said combustion catalyst; a system exhaust gas pipe line for conducting exhaust gas from said fuel cell system into said auxiliary combustor for driving said exhaust gas turbine when recovered energy of said exhaust gas is sufficient therefor; a branch exhaust gas pipe line from said system exhaust gas pipe line for conducting a variable amount of said system exhaust gas to said combustion catalyst; and a fuel mixture pipe line for conducting a mixture of fuel and air to said combustion catalyst together with the variable amount of said system exhaust gas.

2. An air supply apparatus in a fuel cell system according to claim 1, further including a variable orifice disposed in said branch exhaust gas pipe line for conducting the variable amount of the system exhaust gas to said combustion catalyst in said auxiliary combustor to control the amount of the exhaust gas flow to said combustion catalyst and thereby control temperature of combuston of the mixture of fuel and air.

3. An air supply apparatus in a fuel cell system according to claim 2, further including a fuel flow control valve disposed in said fuel mixture pipe line.

4. An air supply apparatus in a fuel cell system according to claim 3, further including: a mixer in said fuel mixture pipe line connecting an air pipe line for supply of air from said compressor to said mixer; and a combustion air flow control valve in said air pipe line.

5. An air supply apparatus in a fuel cell system according to claim 1, wherein said combustion section of said auxiliary combustor comprises a hollow refractory member inside said auxiliary combustor so as to define an annular space between an outer wall of said auxiliary combustor and said member; said combustion catalyst disposed within a cavity of said hollow refractory member; a first honeycomb member disposed beneath said combustion catalyst for supporting said combustion catalyst; and a second honeycomb member disposed above said combustion catalyst for preventing upward movement of said catalyst while forming a substantially uniform flow of combustion gas throuh said combustion section.

6. An air supply apparatus in a fuel cell system according to claim 1, wherein said combustion catalyst is made of vanadium-coated alumina.

* * * * *